(No Model.)

A. CRANDELL.
ROLLING MILL.

No. 281,978. Patented July 24, 1883.

Witnesses:
Edmund Birdhag
Howell Bartte

Inventor:
pro Alfred Crandell,
Johnson and Johnson
Attys

UNITED STATES PATENT OFFICE.

ALFRED CRANDELL, OF PINE PLAINS, NEW YORK.

ROLLING-MILL.

SPECIFICATION forming part of Letters Patent No. 281,978, dated July 24, 1883.

Application filed July 27, 1882. (No model.)

*To all whom it may concern:*

Be it known that I, ALFRED CRANDELL, a citizen of the United States, residing at Pine Plains, Duchess county, New York State, have invented new and useful Improvements in Rolling-Mills, of which the following is a specification.

My invention is directed to the production of metal rods and bars of cylindrical or other form in which the metal is subjected to a compression and condensation at all points in the body of the metal, whereby to effect the reduction equally and uniformly from the surface to the center, and thus prevent the tearing and separation of the grain in the interior of the body caused by unequally-distributed compression and condensation. In the fabrication of metal rods and bars I obtain these objects by the employment of four rolls arranged, formed, and geared together so as to have equal positive motion and equal resistance to the strain, in connection with a circulation of water through the rolls and their journal-bearings, for preventing the undue heating of the rolls and their journal-bearings in the fabrication of heated rods and bars. By reason of this cooling circulation it is made practicable to roll heated bars continuously for an indefinite period with comparatively small rolls, and particularly with such rolls operated by bevel-gear upon the opposite faces of each roll adapted to intermatch at the radial joining of the rolls, for were it not for such cooling circulation such compact construction and arrangement of the rolls and their operating-gear could not be used for continuous operation in reducing heated bars. Four rolls having such relation to each other and geared to have positive equal motion for the manufacture of articles of cylindrical form are illustrated in the accompanying drawings, in which—

Figure 1:
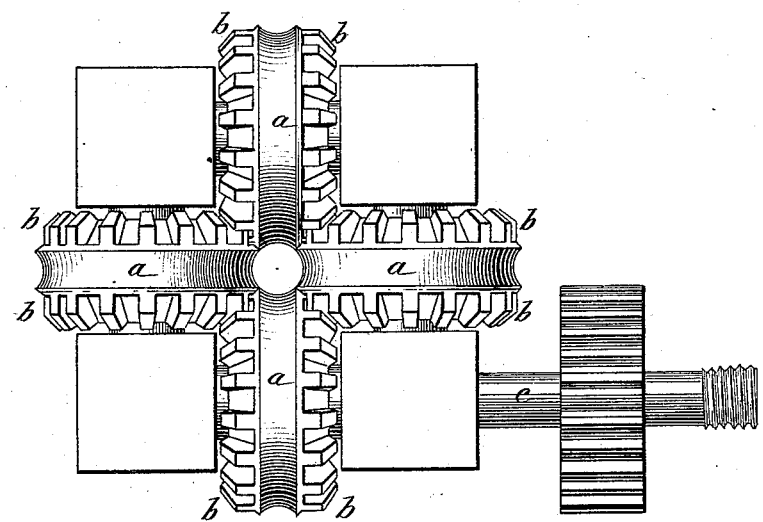
Figure 2:
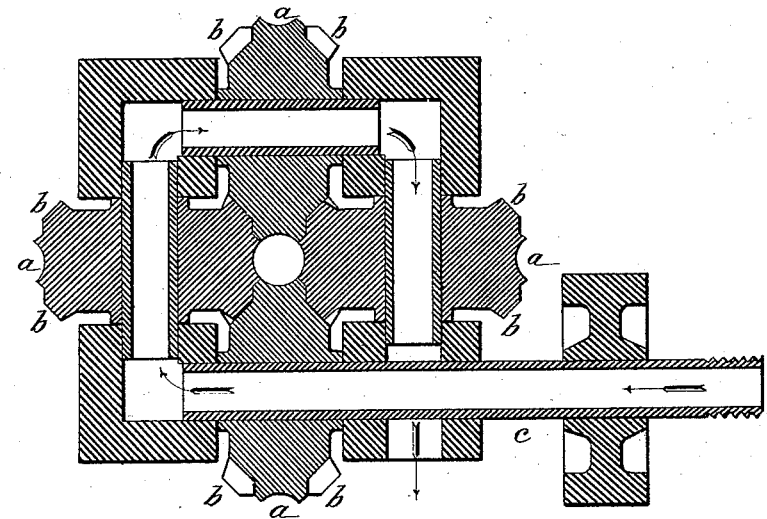

Figure 1 represents an elevation, one side of the housing for the rolls being removed; and Fig. 2, a vertical section, showing the bar in position between the rolls with provision for a circulation of water through the hollow shafts thereof and their journals.

The four rolls are constructed and arranged, as shown, to form a circular passage between them. Each roll has a circumferential groove, *a*, forming a quarter of a circle in cross-section, and when the rolls are joined their quarter arcs meet and complete and maintain the circular passage through which the article is forced in the operation of forming it. The rolls are constructed so that the lines bounding their circumferential grooves will join at four points in radial lines, so that the rolls will revolve together and form a true circle at their junction. They may be of any suitable diameter, and the circular-passage-forming groove of each roll may be of such arc as to form a circle of the desired diameter, but always in arcs of four equal operating-faces having a contact at the junction of the arcs. They may be geared in any suitable way so long as they have equal and positive motion. As shown, they are geared together by intermatching-face bevel-gear—that is to say, each roll is formed with a bevel-gear, *b*, on each face, so that the four rolls will be revolved by gear intermatching on their radial joining lines. For compactness this construction is preferable, and gives the advantage of operating the four rolls with one of them as the driver, the shaft *c* of which is driven in any suitable way. The rolls are mounted in any suitable housing, and may have a fixed relation to each other. The housing or frame is provided with a suitable passage or opening in line with the circle formed by the rolls, for the introduction and delivering of the article from the rolls.

I have shown and described the four rolls as being adapted to produce articles of cylindrical form; but I do not confine myself to any particular form of product, since it is evident that the rolls combined as described may have flat or rectangular-grooved reducing-faces for the fabrication of flat bars.

It will also be understood that the operating-faces of the rolls may be formed of steel bands secured upon the rolls in any suitable way, for the purpose of renewing the reducing-faces and of adapting the rolls for producing different forms of articles.

In rolling hot metal the rolls are liable to become unduly heated, and I provide against this by constructing the shafts of all the rolls hollow, and connect them by chamber-spaces in any suitable way in their bearings or boxes, so as to allow for a stream of cold water to flow through them continuously.

To protect the rolls from rust from leakage of the water circulating through their hollow axles, the open ends of the latter may be fitted with copper tubes or other suitable metal within the communicating chambers of the bearings or boxes; or the exposed parts of the shafts may be galvanized or coated with some metal not affected by water. The communication of the hollow shafts causes the water-flow to cool their bearings and to keep the rollers at a uniform temperature, and such communication can be effected in any suitable manner within the housings of the rolls, so that the flow passing into the shaft of one roll continues through all and passes out at a point near its entrance, maintaining each roll at a uniform temperature, so that they may be geared compactly and made comparatively small without becoming hot enough to prevent continuous work.

While I have described and shown the water-circulation in connection with four metal reducing-rolls, it is obvious that two or more rolls may be cooled by such circulation, the hollow shaft of one being made to communicate with the hollow shaft of the other, so that the flow entering one may pass out of the other.

I claim—

1. The rolls of a rolling-mill, constructed and having their surfaces joined to form a reducing-passage, substantially as described, said rolls being hollow and having communication with each other, whereby a continuous current of cold water is maintained through the rolls to prevent the undue heating thereof when in use, as shown and described.

2. The combination, with the rolls of a rolling-mill having hollow shafts and journal-bearings arranged in the same plane, of housings provided with chambers, into which the journal-bearings open, whereby a continuous flow of cold water is maintained through the rolls to prevent the undue heating thereof, as described, and for the purpose specified.

3. The four rolls, constructed and joined to form a reducing-passage, geared directly with each other, and having hollow shafts communicating to form a continuous passage through them, substantially as described, for the purpose specified.

In testimony whereof I have hereunto set my hand in the presence of two subscribing witnesses.

ALFRED CRANDELL.

Witnesses:
FRED BOSTWICK,
WILLIAM BOSTWICK.